US012567705B2

(12) United States Patent
Weaver et al.

(10) Patent No.: US 12,567,705 B2
(45) Date of Patent: Mar. 3, 2026

(54) ELECTRICAL TERMINAL WITH SECONDARY SACRIFICIAL CONTACT BEAM

(71) Applicant: TE Connectivity Solutions GmbH, Schaffhausen (CH)

(72) Inventors: Brian Keith Weaver, Middletown, PA (US); Andrew B. Fortier, Middletown, PA (US); William James Moyer, II, Selinsgrove, PA (US); David Patrick Orris, Middletown, PA (US)

(73) Assignee: TE Connectivity Solutions GmbH, Schaffhausen (CH)

( * ) Notice: Subject to any disclaimer, the term of this patent is extended or adjusted under 35 U.S.C. 154(b) by 548 days.

(21) Appl. No.: 18/149,774

(22) Filed: Jan. 4, 2023

(65) Prior Publication Data

US 2024/0222914 A1 Jul. 4, 2024

(51) Int. Cl.
*H01R 13/66* (2006.01)
*H01R 13/11* (2006.01)
*H01R 13/703* (2006.01)

(52) U.S. Cl.
CPC ..... *H01R 13/6666* (2013.01); *H01R 13/7032* (2013.01); *H01R 13/113* (2013.01)

(58) Field of Classification Search
CPC ............ H01R 13/6666; H01R 13/7032; H01R 13/113; H01R 13/10; H01R 13/11; H01R 13/111; H01R 13/112; H01R 13/114; H01R 13/03; H01R 13/17; H01R 13/53; H01R 13/6485; H01R 13/05; H01R 13/26; H01R 13/28; H01H 1/38; H01H 2001/0089
USPC .................................................. 439/74, 852
See application file for complete search history.

(56) References Cited

U.S. PATENT DOCUMENTS

| | | | | |
|---|---|---|---|---|
| 6,790,101 | B1 | 9/2004 | Data et al. | |
| 9,543,706 | B2 | 1/2017 | Zhang | |
| 9,620,904 | B2 | 4/2017 | Kao et al. | |
| 10,014,614 | B2 * | 7/2018 | Davies .................. | H01R 4/184 |
| 10,020,613 | B2 | 7/2018 | Lyon et al. | |
| 2021/0194179 | A1 | 6/2021 | Pepe et al. | |

FOREIGN PATENT DOCUMENTS

| | | | |
|---|---|---|---|
| JP | 2009081143 | A | 4/2009 |
| TW | M398701 | U | 2/2011 |

* cited by examiner

*Primary Examiner* — Renee S Luebke
*Assistant Examiner* — Paul D Baillargeon

(57) ABSTRACT

An electrical terminal having a mating portion having at least one primary contact beam and at least one sacrificial contact beam. The at least one primary contact beam has a contact width. The at least one sacrificial contact beam having a recess provided in line with the at least one primary contact beam, the recess having a recess width which is equal to or greater than the first width of the primary contact beam.

17 Claims, 4 Drawing Sheets

ELECTRICAL TERMINAL WITH SECONDARY SACRIFICIAL CONTACT BEAM

FIELD OF THE INVENTION

The present invention relates to an electrical terminal having a secondary sacrificial contact beam which allows for hot mating and unmating. In particular, the invention is directed to an electrical terminal which prevents excess wear and surface degradation in the contact area during mating and unmating.

BACKGROUND OF THE INVENTION

Mating electrical connectors typically employ male and female or receptacle terminals. Many applications require that connectors equipped with these types of terminals be mated and unmated while electrical power is present at the terminals. During hot mating and unmating, electrical arcs may be created by electrical current passing through the terminals as the terminals are mated or unmated. The terminals may become damaged by such arcing. Furthermore, non-conductive or poorly conducting residues, such as carbon and the like, may build up on the surface of the electrical terminals due to the arcing. Such residues can interfere with the quality of the electrical connection between the terminals in a subsequent connection.

Some attempts to provide protection against arc discharging in the prior art include providing forward or lateral extensions on the terminals for sequential engagement of the terminals. While effective in reducing the negative effects of arcing, such terminals were larger than necessary due to the extra space required by these forward or lateral extensions. In addition, know terminals of this type do not perform well over a number of cycle, as the excess wear and surface degradation occurs in the contact area during mating and unmating.

Consequently, there is a need for an electrical terminal that has a secondary sacrificial contact beam which allows for hot mating and unmating and which prevents excess wear and surface degradation in the contact area during mating and unmating.

SUMMARY OF THE INVENTION

An embodiment is directed to an electrical terminal having a mating portion having at least one primary contact beam and at least one sacrificial contact beam. The at least one primary contact beam has a contact width. The at least one sacrificial contact beam having a recess provided in line with the at least one primary contact beam, the recess having a recess width which is equal to or greater than the first width of the primary contact beam.

In various embodiments, the at least one primary contact beam extends from a main body of the terminal, the at least one primary contact beam has a first arcuate contact portion. The at least one sacrificial contact beam extends from the main body of the terminal and is spaced from the at least one primary contact beam, the at least one sacrificial contact beam has a second arcuate contact portion.

In various embodiments, the at least one sacrificial contact beam has two fixed ends and two transition portions which are space from each other by opening. The second arcuate contact portion of spans the opening and connects the transition portions. The at least one primary contact beam extends from the main body into the opening.

In various embodiments, the normal force exerted by the at least one primary contact on a mating terminal is different than the normal force exerted by the at least one sacrificial contact. In various embodiments, the normal force exerted by the at least one primary contact is greater than the normal force exerted by the at least one sacrificial contact.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
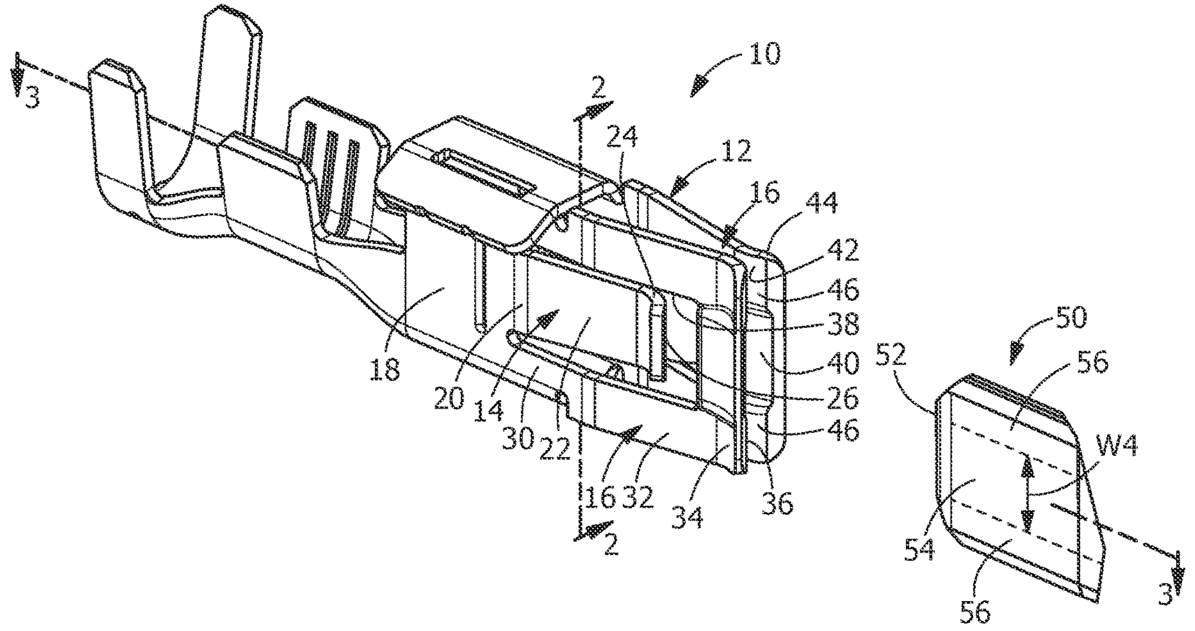
FIG. 1 is a front perspective view of an illustrative embodiment of a female electrical terminal with opposed sacrificial contact beams in accordance with the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
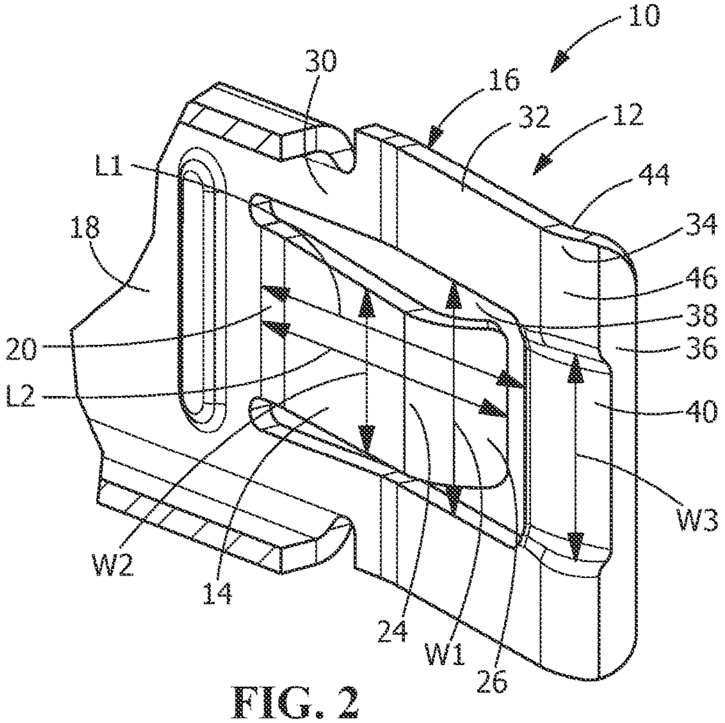
FIG. 2 is a perspective cross sectional view of a mating end of the electrical terminal of FIG. 1 taken along line 2-2 of FIG. 1.

As shown in FIGS. 1 and 2, an illustrative electrical terminal 10 according to the present invention has a mating portion 12 with at least one primary contact beam 14 and at least one initial or sacrificial contact beam 16. In the illustrative embodiment shown, the electrical terminal 10 has two opposed primary contact beams 14 and two opposed initial or sacrificial contact beams 16.

The primary contact beams 14 extend from a main body 18 of the terminal 10. The primary contact beams 14 have fixed ends 20, transition portions 22, arcuate contact portions 24 and lead in surfaces 26. The fixed ends 20 are integrally attached to the main body 18 of the terminal 10. The transition portions 22 extend between the fixed ends 20 and the arcuate contact portions 24. The transition portions 22 extend at an angle from the fixed ends 20 wherein the arcuate contact portions 24 are positioned in a plane which is offset from a plane of the fixed ends 20 when the primary contact beams 14 are in an unstressed position. The lead in surfaces 26 extend from the arcuate contact portion 24 and are provided at the free ends of the primary contact beams 14.

The initial or sacrificial contact beams 16 extend from a main body 18 of the terminal 10 and are spaced from the primary contact beams 14. The initial or sacrificial contact beams 16 have fixed ends 30, transition portions 32, arcuate contact portions 34 and lead in surfaces 36. The fixed ends 30 are integrally attached to the main body 18 of the terminal 10. The transition portions 32 extend between the fixed ends 30 and the arcuate contact portions 34. The transition portions 32 extend at an angle from the fixed ends 30 wherein the arcuate contact portions 34 are positioned in a plane which is offset from a plane of the fixed ends 30 when the initial or sacrificial contact beams 16 are in an unstressed position. The lead in surfaces 36 extend from the arcuate contact portions 34 and are provided at the free ends of the initial or sacrificial contact beams 16.

As shown in FIG. 2, each initial or sacrificial contact beam 16 has two fixed ends 30 and two transition portions 32 which are space from each other by opening 38. The arcuate contact portion 34 and the lead in surface 36 of each initial or sacrificial contact beam 16 spans the opening 38 and connects the transition portions 32. Respective primary contact beams 14 extend from the main body 18 into the opening 38.

The opening 38 of each initial or sacrificial contact beam 16 has a length L1 and a width W1 which is larger than the length L2 and the width W2 of each primary contact beam 14. The allows each primary contact beams 14 to move relative to a respective initial or sacrificial contact beam 16 without mechanically or electrically engaging the initial or sacrificial contact beam 16.

The arcuate contact portions 34 of the initial or sacrificial contact beams 16 have recesses 40 provided therein. The recesses 40 extend from a bottom or first surface 42 of the arcuate contact portions 34 toward a top or second surface 44 of the arcuate contact portions 34. The recesses 40 are provided in line with the primary contact beams 14. The recesses 40 have a width W3 which is larger than the width W2 of the primary contact beams 14. Contact surfaces 46 are provided on the arcuate contact portions 34 either side of the recesses 40. The contact surfaces are spaced apart by the width W3.

Figure 3:
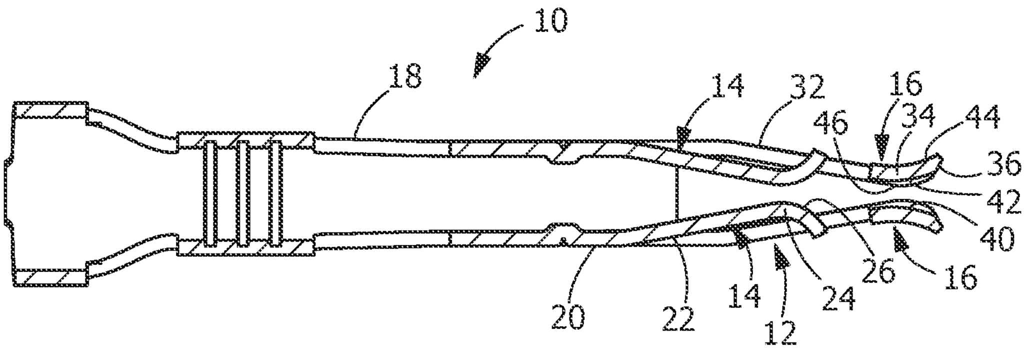
FIG. 3 is a cross sectional view of the mating end of the electrical terminal taken along line 3-3 of FIG. 1.

FIGS. 3-9, sequentially illustrate the insertion of the male terminal 50, which in this embodiment is in the form of a generally rectangular tab, into the mating portion 12 of the female terminal 10. FIG. 3 illustrates the condition in which no male terminal 50 is in the mating portion 12. In this position, all of the primary contact beams 14 and the initial or sacrificial contact beams 16 are in an initial or unstressed position.

Figure 4:
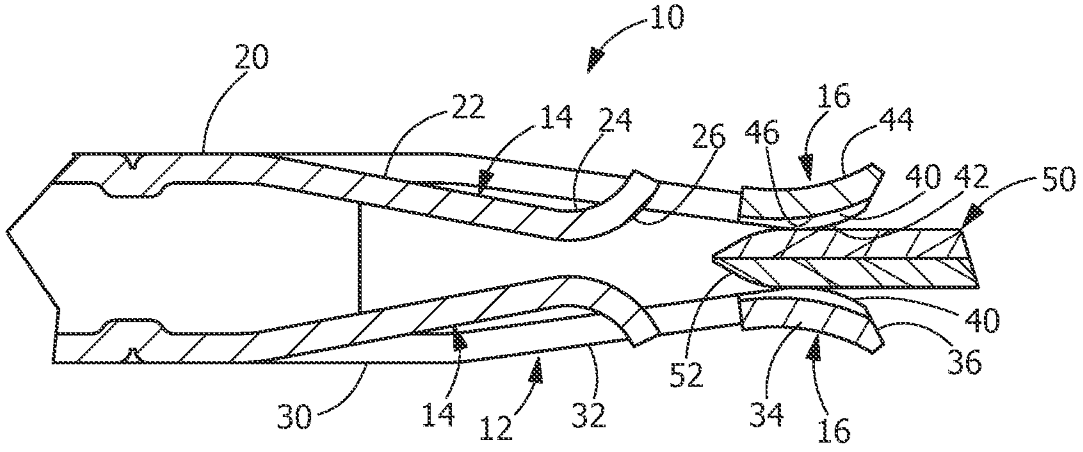
FIG. 4 is a cross sectional view similar to FIG. 3 with a mating tab partially inserted into the mating end of the female terminal such that an end of the tab initially engages a sacrificial contact beam of the female terminal.
Figure 5:
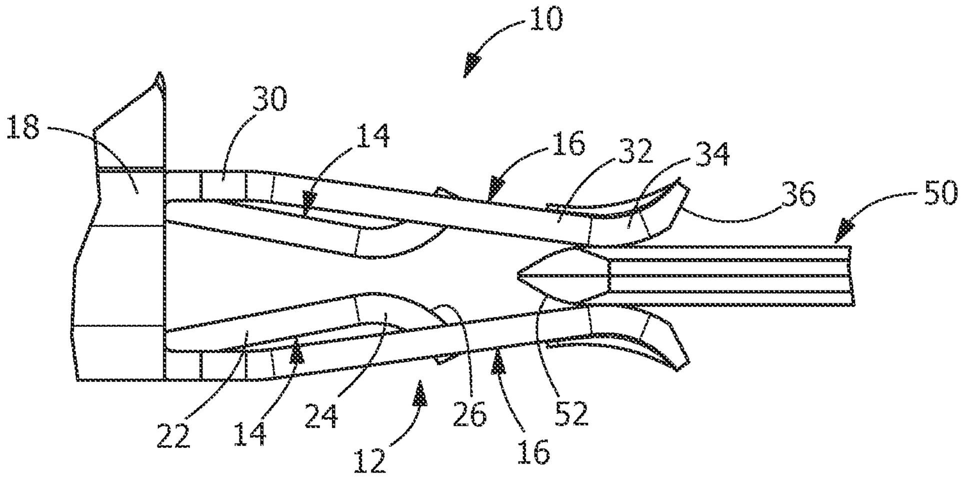
FIG. 5 is a top view of the mating tab partially inserted into the mating end of the female terminal such that the end of the tab initially engages the sacrificial contact beam of the female terminal, as shown in FIG. 4.

FIGS. 4 and 5 illustrate the condition in which male terminal 50 is beginning to be inserted into the mating portion 12 of the female terminal 10. A tapered free end 52 of the terminal 50 is moved into initial engagement with contact surfaces 46 of the arcuate contact portions 34 of the initial or sacrificial contact beams 16. The male terminal 50 causes the initial or sacrificial contact beams 16 to elastically deform away from a center axis of the female terminal 10. This causes the initial or sacrificial contact beams 16 to exert a normal force on the male terminal 50.

During the initial portion of the insertion, if there is a voltage potential between the male contact 50 and the female contact 10, as may be the case with hot pluggable connectors, an arc discharge may occur between male terminal 50 and the contact surfaces 46 of the arcuate contact portions 34 of the initial or sacrificial contact beams 16 of the female contact 10. The arc discharge occurs between the contact surfaces 46 and the outer portions 56 of the male terminal 50, no arc discharge occurs at the center portions 54 of the male terminal 50.

During the initial portion of the insertion of the male terminal 50 into the mating portion 12 of the female terminal 10, the recesses 40 of the arcuate contact portions 34 of the initial or sacrificial contact beams 16 do not engage the center portions 54 of the terminal 50. The center portions 54 of the terminal 50 have a width W4 (FIG. 1) which is essentially the same width as the width W2 of the primary contact beams 14. As the recesses 40 do not engage the center portions 54 of the terminal 50, there is no arc discharge between the recesses 40 and the center portions 54 of the male terminal 50, thereby preventing surface degradation of the center portions 54 of the terminal 50 as mating occurs. In addition, at the recesses 40 do not engage the center portions 54 of the terminal 50, the initial or sacrificial contact beams 16 do not frictionally engage the center portions 54 of the terminal 50, thereby preventing the initial or sacrificial contact beams 16 from causing wear to the center portions 54 of the terminal 50.

Figure 6:
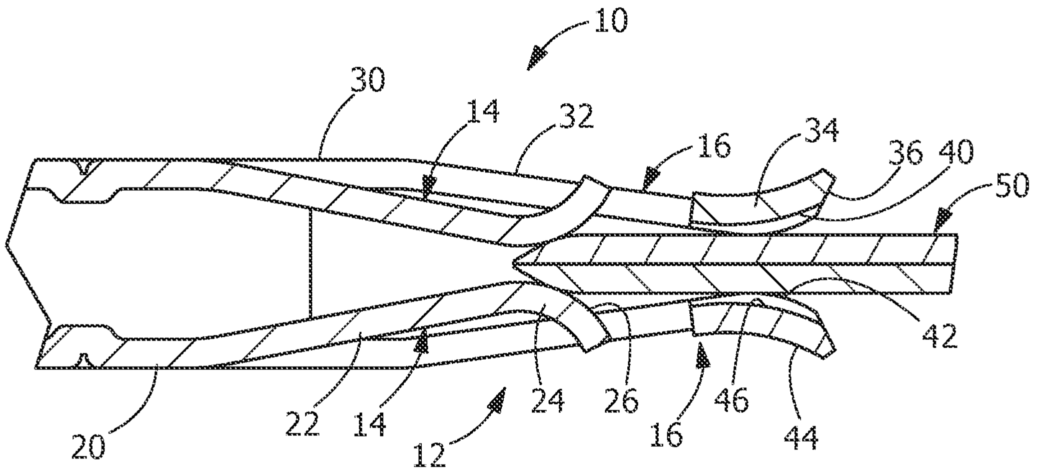
FIG. 6 is a cross sectional view similar to FIG. 4 with the mating tab partially inserted into the mating end of the female terminal such that an end of the tab engages a primary contact beam of the female terminal.
Figure 7:
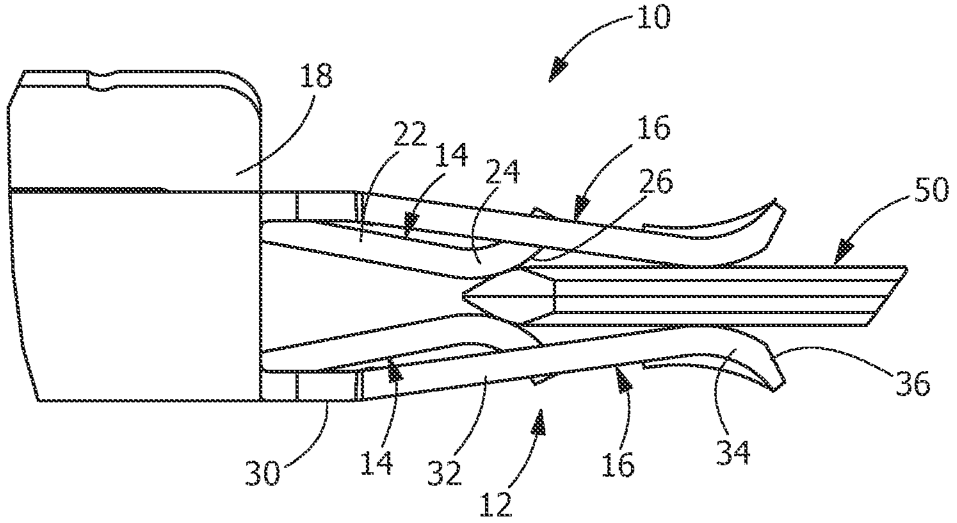
FIG. 7 is a top view of the mating tab partially inserted into the mating end of the female terminal such that the end of the tab engages the primary contact beam of the female terminal, as shown in FIG. 6.

FIGS. 6 and 7 illustrate the condition in which the male terminal 50 is further inserted into the mating portion 12, such that the tapered free end 52 is moved past the arcuate contact portions 34 of the initial or sacrificial contact beams 16 and into engagement with the arcuate contact portions 24 of the primary contact beams 14. The male terminal 50 causes the primary contact beams 14 to elastically deform away from a center axis of the female terminal 10. This causes the primary contact beams 14 to exert a normal force on the male terminal 50.

During this portion of the insertion, the center portions 54 of the male terminal 50 is placed in mechanical and electrical connection with the contact portions 24 of the primary contact beams 14. As this engagement occurs, there is no arc discharge, even in the case of hot pluggable connectors, as the voltage potential has been addressed by the previous engagement of the initial or sacrificial contact beams 16 with the male terminal 50.

During this portion of the insertion of the male terminal 50 into the mating portion 12 of the female terminal 10, the contact portions 24 of the primary contact beams 14 only engage the center portions 54 of the terminal 50. The contact portions 24 of the primary contact beams 14 do not engage the outer portions 56 of the male terminal 50. As the center portions 54 of the terminal 50 are not engaged by the contact surfaces 46 of the initial or sacrificial contact beams 16, the center portions 54 do not have surface degradation caused by arcing or wear caused by frictional engagement with the initial or sacrificial contact beams 16. Consequently, a positive electrical connection is effected between the contact portions 24 of the primary contact beams 14 of the terminal 10 and the center portions 54 of the terminal 50.

Figure 8:
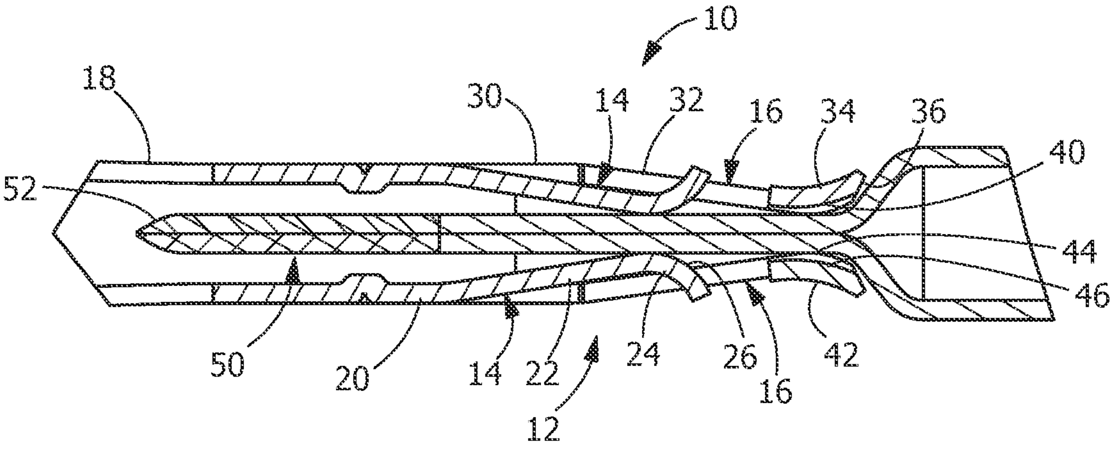
FIG. 8 is a cross sectional view similar to FIG. 6 with the mating tab fully inserted into the mating end of the female terminal such that the mating tab engages both the sacrificial contacts and the primary contact beam of the female terminal.
Figure 9:
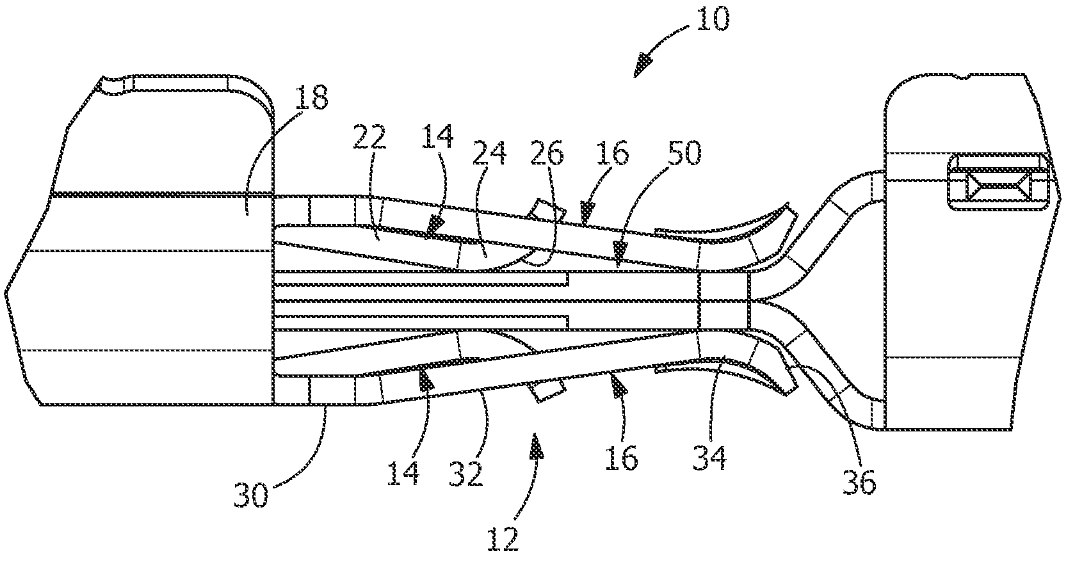
FIG. 9 is a top view of the mating tab fully inserted into the mating end of the female terminal such that the mating tab engages both the sacrificial contacts and the primary contact beam of the female terminal, as shown in FIG. 8.

FIGS. 8 and 9 illustrate the complete insertion of male terminal 50 into the mating portion 12 of the female terminal 10. The elasticity of the primary contact beams 14 and the initial or sacrificial contact beams 16 holds and biases the primary contact beams 14 and the initial or sacrificial contact beams 16 against the male terminal 50 by applying normal forces thereto to maintain an improved electrical connection between the male terminal 50 and the female terminal 10.

As shown in FIGS. 1 and 2, the length and geometry of the primary contact beams 14 and the initial or sacrificial contact beams 16 are different and can be altered to accommodate specific normal forces. Consequently, when male terminal 50 is fully inserted into the mating portion 12 of the female terminal 10, as shown in FIGS. 8 and 9, the normal forces applied by the primary contact beams 14 and the initial or sacrificial contact beams 16 may be essentially the same or may be different. For example, the normal force of the primary contact beams 14 may be greater than the normal force of the initial or sacrificial contact beams 16. As the primary electrical connection between the male terminal 50 and the female terminal 10 occurs at the arcuate contact portions 24 of the primary contact beams 14, the increased normal force ensures that a positive electrical connection is effected and maintained. The normal force applied by the arcuate contact portions 34 of the initial or sacrificial contact beams 16 does not need to be large, as an increased normal force in not required to facility the designed arcing between the male terminal 50 and the female terminal 10. In various illustrative embodiments, the normal force applied by the arcuate contact portions 24 of the primary contact beams 14 is at least approximately twice the normal force applied by the arcuate contact portions 34 of the initial or sacrificial contact beams 16. In various illustrative embodiments, the normal force applied by the primary contact beams 14 is greater than approximately 2.0 newtons, greater than approximately 2.5 newtons, between approximately 2.0 and approximately 5.0 newtons, while the normal force applied by the initial or sacrificial contact beams 16 is less than approximately 1.5 newtons, less than approximately 2.0 newtons, between approximately 1.0 and approximately 3.0 newtons.

One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical terminal comprising:

a mating portion having at least one primary contact beam and at least one sacrificial contact beam;

the at least one primary contact beam having a primary contact width, the at least one primary contact beam extending from a main body of the terminal, the at least one primary contact beam having a first arcuate contact portion;

the at least one sacrificial contact beam extending from the main body of the terminal and being spaced from the at least one primary contact beam, the at least one sacrificial contact beam has a second arcuate contact portion, the at least one sacrificial contact beam having a recess provided in line with the at least one primary contact beam, the recess having a recess width which is equal to or greater than the primary contact width of the primary contact beam, the recess extending from a first surface of the second arcuate contact portion of the at least one sacrificial contact beam in a direction away from the at least one primary contact beam and toward a second surface of the second arcuate contact portion of the at least one sacrificial contact beam;

wherein the recess of the at least one sacrificial contact beam does not engage a center portion of a mating terminal when the mating terminal is inserted into the mating portion.

2. The electrical terminal as recited in claim 1, wherein the at least one primary contact beam is two opposed primary contact beams.

3. The electrical terminal as recited in claim 2, wherein the at least one sacrificial contact beam is two opposed sacrificial contact beams.

4. The electrical terminal as recited in claim 1, wherein the at least one primary contact beam has a fixed end, a transition portion, and a lead in surface, the transition portion extends between the fixed end and the first arcuate contact portion, the transition portion extends at an angle from the fixed end wherein the first arcuate contact portion is positioned in a plane which is offset from a plane of the fixed end when the at least one primary contact beam is in an unstressed position.

5. The electrical terminal as recited in claim 1, wherein the at least one primary contact beam is configured to move relative to the at least one sacrificial contact beam without mechanically or electrically engaging the at least one sacrificial contact beam.

6. The electrical terminal as recited in claim 1, wherein the recess width is larger than the primary contact width of the at least one primary contact beam.

7. The electrical terminal as recited in claim 6, wherein contact surfaces are provided on the second arcuate contact portion at either side of the recess, the contact surfaces are spaced apart by the recess width, wherein upon the insertion of a mating terminal in the mating portion, the contact surfaces of the second arcuate contact portion of the at least one sacrificial beam engage the mating terminal prior to the mating terminal engaging the at least one primary contact to allow an arc discharge to occur between mating terminal and the contact surfaces of the second arcuate contact portion of the at least one sacrificial contact beam of the terminal.

8. The electrical terminal as recited in claim 7, wherein during insertion of the mating terminal into the mating portion, no arc discharge occurs at a center portion of the mating terminal, the center portion having a center portion width which is equal to the contact width of the at least one primary contact beam, wherein the center portion of the mating terminal has no surface degradation or wear caused by the mating of the mating terminal with the terminal.

9. The electrical terminal as recited in claim 1, wherein upon insertion of a mating terminal into the mating portion of the terminal, the at least one primary contact and the at least one sacrificial contact are configured to elastically deform and exert normal forces on the mating terminal.

10. The electrical terminal as recited in claim 9, wherein a geometry of the at least one primary contact and the at least one sacrificial contact are different.

11. The electrical terminal as recited in claim 10, wherein a normal force exerted by the at least one primary contact is different than a normal force exerted by the at least one sacrificial contact.

12. The electrical terminal as recited in claim 11, wherein the normal force exerted by the at least one primary contact is greater than the normal force exerted by the at least one sacrificial contact.

13. An electrical terminal comprising:

a mating portion having at least one primary contact beam and at least one sacrificial contact beam;

the at least one primary contact beam having a primary contact width, the at least one primary contact beam having a first arcuate contact portion;

the at least one sacrificial contact beam has a second arcuate contact portion, the at least one sacrificial contact beam having a recess provided in line with the at least one primary contact beam, the recess having a recess width which is equal to or greater than the primary contact width of the primary contact beam;

the at least one sacrificial contact beam having fixed ends, transition portions, and a lead in surface, the transition portions extend between the fixed ends and the second arcuate contact portion, the transition portions extend at an angle from the fixed ends wherein the second arcuate contact portion is positioned in a plane which is offset from a plane of the fixed ends when the at least one sacrificial contact beam is in an unstressed position.

14. The electrical terminal as recited in claim 13, wherein the at least one sacrificial contact beam has two fixed ends and two transition portions which are spaced from each other by an opening, the second arcuate contact portion and the lead in surface span the opening and connect the transition portions.

15. The electrical terminal as recited in claim 14, wherein the at least one primary contact beam extends from the main body into the opening.

16. The electrical terminal as recited in claim 15, wherein the opening of the at least one sacrificial contact beam has a first length and a first width, the first length is larger than a second length of the at least one primary contact beam, the first width is larger than the primary contact width of the at least one primary contact beam.

17. An electrical terminal comprising:

a mating portion having at least one primary contact beam and at least one sacrificial contact beam;

the at least one primary contact beam having a primary contact width;

the at least one sacrificial contact beam having a recess provided in line with the at least one primary contact beam, the recess having a recess width which is equal to or greater than the primary contact width of the primary contact beam, contact surfaces are provided on an arcuate contact portion of the at least one sacrificial contact beam at either side of the recess, the contact surfaces are spaced apart by the recess width;

wherein upon the insertion of a mating terminal in the mating portion, the contact surfaces of the arcuate contact portion of the at least one sacrificial beam engage the mating terminal prior to the mating terminal engaging the at least one primary contact to allow an arc discharge to occur between the mating terminal and the contact surfaces of the second arcuate contact portion of the at least one sacrificial contact beam of the terminal.

* * * * *